No. 826,353. PATENTED JULY 17, 1906.
R. B. PAINTON.
COUPLING RETAINING MEANS FOR METALLIC HOSE.
APPLICATION FILED AUG. 4, 1905.
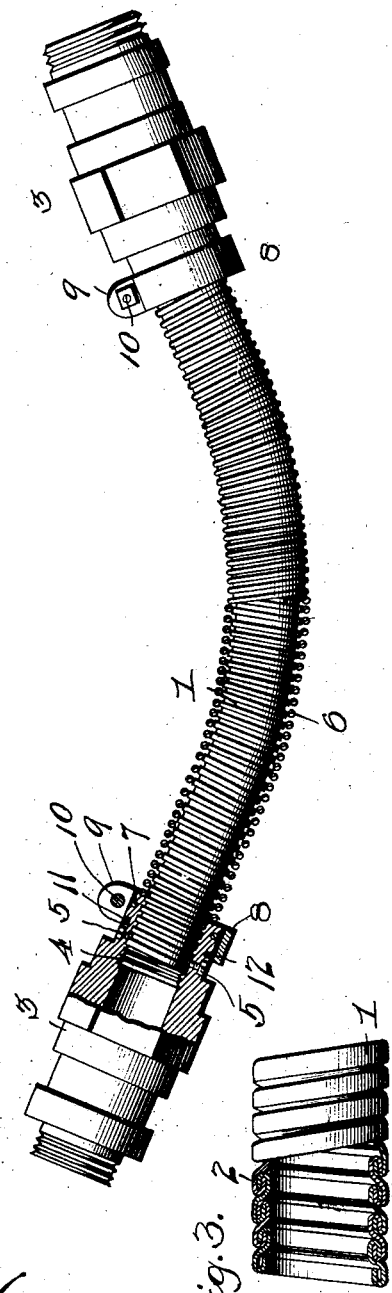
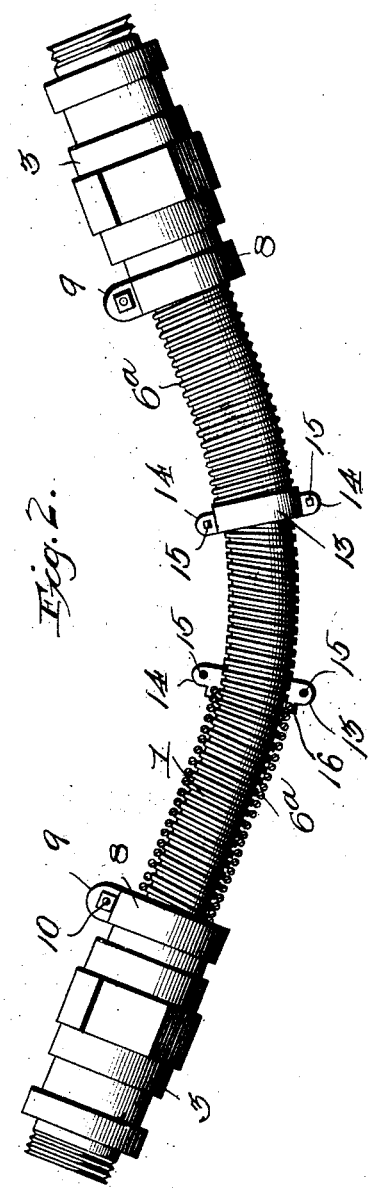
Witnesses
R. C. Braddock.
Inventor
Richard B. Painton
By
Attorney

UNITED STATES PATENT OFFICE.

RICHARD BENJAMIN PAINTON, OF WILLIAMSPORT, PENNSYLVANIA, ASSIGNOR OF ONE-THIRD TO JACOB HESS BAILEY, OF MUNCY, PENNSYLVANIA, AND WILLIAM BAILEY, OF JERSEY SHORE, PENNSYLVANIA.

COUPLING-RETAINING MEANS FOR METALLIC HOSE.

No. 826,353.     Specification of Letters Patent.     Patented July 17, 1906.

Application filed August 4, 1905. Serial No. 272,753.

*To all whom it may concern:*

Be it known that I, RICHARD BENJAMIN PAINTON, a citizen of the United States, residing at Williamsport, in the county of Lycoming and State of Pennsylvania, have invented certain new and useful Improvements in Coupling-Retaining Means for Metallic Hose, of which the following is a specification.

This invention relates to metallic hose or tubing of the type designed particularly as a substitute for the ordinary rubber hose such as employed for air-brake, signal, and steam-pipe connections for railway-cars, and primarily has in view improved retaining means for the coupling connections for the hose.

The improvements are specially applicable to that type of flexible metallic hose essentially consisting of a close spirally-wound metal strip or ribbon, each convolution or coil of which has a loose-packed joint connection with the adjacent convolutions or coils, whereby the tubing may be bent or distorted to any position and maintain an imperforate non-leaking passage-way therethrough. This form of metallic tubing possesses special utility as a substitute for the ordinary rubber brake-hose on account of the exceptional strength and durability thereof, besides its economy over the use of rubber. It is well known that the ordinary rubber brake-hose quickly loses its utility. The weather conditions cause the same to harden and crack, while constant manipulation occasions the frequent tearing away thereof from its coupling. These objections are entirely overcome by the employment of a flexible-jointed metallic tubing of the character indicated, and the present invention is designed to increase the efficiency thereof in its use for various purposes, particularly as the hose connection for the air-brake, signal, or steam pipes of railway-trains.

The particular utility of a flexible jointed metallic tubing such as described has already been demonstrated; but one of the difficulties attending the use thereof is that of a tendency to work out of its coupling connection or move to such position as would permit of leakage. It is therefore the main and primary object of this invention to associate with flexible metallic tubing a joint-sustaining spring so arranged and related thereto as to maintain a permanent non-leaking joint between the metallic tubing and its couplings or coupling connections, besides maintaining the individual joints of the tubing itself tight under all conditions and in all positions of the tubing, thereby reducing the possibility of leakage to a minimum at any point throughout the length or at the coupling ends of the tubing.

With these and other objects in view, which will more readily appear as the nature of the invention is better undertsood, the same consists in the novel construction, combination, and arrangement of parts which will be hereinafter more fully described, illustrated, and claimed.

The essential features of the invention involved in the association of a joint-sustaining spring with a metallic tubing are necessarily susceptible to modification without departing from the spirit of the invention, but perferred embodiments thereof are shown in the accompanying drawings, in which—

Figure 1 is an elevation, partly in section, of a metallic hose embodying the present invention and shown adapted for use as an air-brake connection. Fig. 2 is a similar view showing a modification in which a separate joint-sustaining spring may be associated with each end cap for the tubing or hose. Fig. 3 is a detail sectional view of a portion of tubing with which the invention is preferably associated.

Like reference-numerals designate corresponding parts throughout the several figures of the drawings.

In carrying out the invention no special change is intended in the construction of the metallic tubing. Any of the known methods of manufacturing this tubing may be resorted to, and in the drawings the same is designated by the numeral 1. The form of tubing shown in the drawings essentially consists of a closely and spirally wound metal strip or ribbon, the individual convolutions or coils of which are loosely interlocked and packed, as indicated by the numeral 2 in Fig. 3 of the drawings.

By reason of the spiral coiling of the strip or ribbon constituting the metallic tubing the convolutions of coils thereof have a pitch in one direction, and in the employment of the tubing, particularly as an air-brake connection, the same is designed to have fitted to the opposite ends thereof the couplings 3, adapted to be connected with the usual fittings of the air-brake system. However, the couplings 3 may be of such a nature as to connect the section of tubing shown in the drawings with any line of piping for any purpose; but irrespective of the use of the metallic hose or tubing the couplings 3 are preferably provided at one end with the interiorly-threaded necks 4, adapted to be screwed onto the ends of the tubing 1 and secured thereon through the medium of the set-screws or equivalent fastenings 5.

By reason of the spiral or thread-like winding of the coils of the tubing 1 the constant handling and twisting of said tubing has a tendency to loosen up the threaded joint connections between the same and the couplings 3 and, in fact, to unscrew from said connections, so it is the purpose of the present invention to obviate that result. This is accomplished primarily through the medium of a joint-sustaining spring 6.

The joint-sustaining spring 6 is thoroughly tempered and is designed to be arranged on the exterior of the metallic tubing 1. One of the distinctive features of the invention resides in having the coils or convolutions of the spring 6 wound opposite to and crossing the coils or convolutions of the tubing 1, as plainly shown in Fig. 1 of the drawings, so that when said spring is coupled or fastened up the contrary pitch or winding thereof will serve to counteract any tendency of the tubing 1 to screw out of its terminal couplings. Furthermore, the spring 6 is designed to be slightly compressed to its fastened position, so as to normally exert a straightening and tightening influence throughout the entire extent of tubing over which it is placed, and in one form of the invention the spring 6 extends over the metallic tubing 1 the entire length of the latter and has a rigid yet detachable fastened connection with the permanent couplings 3 for the tubing.

Any suitable and practical expedients may be resorted to for rigidly and detachably securing the ends of the joint-sustaining spring 6 to the terminal couplings 3. A simple means for accomplishing this result is shown in the drawings and may consist of providing the threaded neck 4 of each coupling 3 with an exterior annular groove 7, receiving a terminal coil of the spring, which is bound in said screw through the medium of a detachable fastening-clamp 8. This clamp is illustrated as being of the split band or ring type, having at its terminals the bolt-ears 9, receiving the clamp-bolt 10 for tightening the clamp body or ring upon the exterior of the coupling-neck 4. Also the clamp body or ring may be provided with a retaining lug or lugs 11, engaging corresponding sockets or grooves 12 in the neck 4 to provide means for positively preventing displacement of the clamp from its position over the spring-coil held in the groove 7.

In the arrangement of the invention described it will be seen that the sustaining-spring 6 extends from one end of the metallic tubing to the other end and is securely fastened at its ends to the terminal couplings for the tubing. By reason of normally exerting a contractile stress it will be obvious that in addition to its function of counteracting any tendency of the tubing to turn out of its couplings the same will hold the couplings tight upon the tubing ends and also will constantly maintain the individual joints of the tubing tight in whatever position the tubing may be moved. Also the spring always tends to straighten the tubing.

A modification of the invention which may be resorted to is illustrated in Fig. 2 of the drawings and consists in associating a separate joint-sustaining spring $6^a$ with each of the terminal couplings 3, but connecting it with such couplings in the same manner as already described. However, in this adaptation the springs are intended to terminate short of each other at an intermediate point on the tubing 6, so as to leave a sufficient portion of said tubing uncovered by the spring to facilitate the handling thereof in its use as a brake or similar hose.

In the employment of a separate spring $6^a$ extending from each coupling 3 to an intermediate point of the metallic tubing 1, the inner end of the spring must be held on the tubing through the medium of a suitable clamp, (designated by the number 13 in the drawings.) This clamp may consist of a spring-band having terminal bolt-ears 14 to receive a clamp-bolt 15 and provided with an interior holding-groove 16, so that when the clamp-band is tightened upon the tubing the inner end of the spring will be held fast and positively prevented from displacement.

Other modifications will suggest themselves to those skilled in the art, and it will therefore be understood that various changes in the form, proportion, and minor details of construction may be resorted to without departing from the spirit of the invention or sacrificing any of the advantages thereof.

What I claim as my invention, and desire to secure by Letters Patent, is—

1. The combination with a flexible metallic tubing, of a screw-fitting for said tubing, and a separate joint-sustaining spring connected with said fitting and with the tubing in a manner to oppose rotation of the latter in the direction of unscrewing.

2. The combination with a flexible metallic tubing, of a part connected to one end thereof by a screw connection, a spring carried by the tubing and having one end connected to said part and the other end in connection with the tubing in a manner to oppose its rotation in the direction to unscrew it from the said connected part.

3. The combination of a flexible coiled metallic tubing having terminal coupling connections, and a retractile joint-sustaining spring encircling the tubing and rigidly secured to the coupling connections thereof, said spring having its coils wound in an opposite direction to those of the tubing.

4. The combination of a flexible coiled metallic tubing, couplings detachably mounted on the ends of the tubing, a coiled joint-sustaining spring arranged upon the tubing and having its coils wound in an opposite direction to the coils of the latter, and fastening-clamps detachably mounted on the terminal couplings and engaging the ends of the joint-sustaining spring.

5. The combination of a flexible metallic tubing, and a separate joint-sustaining spring coiled about said tubing and having fastened connections for its ends, said spring being contracted to its fastened position.

6. The combination of a flexible metallic tubing, and a separate joint-sustaining spring coiled about the tubing and having its coils wound in an opposite direction to those of the tubing, and fastening connections for the ends of the spring.

In testimony whereof I affix my signature in presence of two witnesses.

RICHARD BENJAMIN PAINTON.

Witnesses:
RENA C. BRADDOCK.
D. P. WOLHAUPTER.